US012707547B2

(12) United States Patent
Van De Sluis et al.

(10) Patent No.: US 12,707,547 B2
(45) Date of Patent: Aug. 11, 2026

(54) METHOD AND LIGHTING SYSTEM WITH ADAPTIVE COLOR CONTROL

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Tobias Borra, Rijswijk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 45 days.

(21) Appl. No.: 18/878,359

(22) PCT Filed: Jun. 20, 2023

(86) PCT No.: PCT/EP2023/066708
§ 371 (c)(1),
(2) Date: Dec. 23, 2024

(87) PCT Pub. No.: WO2024/002796
PCT Pub. Date: Jan. 4, 2024

(65) Prior Publication Data

US 2025/0386411 A1 Dec. 18, 2025

(30) Foreign Application Priority Data

Jun. 27, 2022 (EP) .................................... 22181130

(51) Int. Cl.
*H05B 47/115* (2020.01)
*H05B 45/20* (2020.01)
(Continued)

(52) U.S. Cl.
CPC ........... *H05B 47/115* (2020.01); *H05B 45/20* (2020.01); *H05B 47/155* (2020.01); *H05B 47/1985* (2024.01); *H05B 47/19* (2020.01)

(58) Field of Classification Search
None
See application file for complete search history.

(56) References Cited

U.S. PATENT DOCUMENTS 9,125,274 B1 9/2015 Brunault et al.
10,719,059 B2 * 7/2020 Stewart ................ G05B 19/042
(Continued)

FOREIGN PATENT DOCUMENTS

EP 1408276 B1 8/2009

*Primary Examiner* — Anh Q Tran

(57) ABSTRACT

A method for controlling a plurality of color light sources is provided. The method comprises receiving (2010) a reference light scene comprising a color setting for at least one of the light sources. The method further comprises determining (2020) a position of a user in relation to the plurality of color light sources. The method further comprises determining (2030) a subset of the plurality of color light sources which are arranged to illuminate the position of the user. The method further comprises determining (2040) a desaturated light setting for at least one of the color light sources of the determined subset; and controlling (2050) the plurality of color light sources based on the reference light scene, wherein the at least one color light source of the determined subset is controlled according to the determined desaturated light setting.

13 Claims, 5 Drawing Sheets

(51) Int. Cl.
*H05B 47/155* (2020.01)
*H05B 47/175* (2020.01)
*H05B 47/19* (2020.01)

(56) References Cited

U.S. PATENT DOCUMENTS

| | | | | |
|---|---|---|---|---|
| 11,818,820 | B2 * | 11/2023 | Meerbeek | H05B 47/105 |
| 2006/0071605 | A1 * | 4/2006 | Diederiks | H05B 47/125<br>315/76 |
| 2013/0249410 | A1 * | 9/2013 | Thompson | H05B 47/1985<br>315/158 |
| 2016/0029458 | A1 | 1/2016 | Liu et al. | |
| 2018/0249554 | A1 * | 8/2018 | Aliakseyeu | H05B 47/155 |
| 2019/0215931 | A1 | 7/2019 | Magielse et al. | |
| 2019/0350066 | A1 | 11/2019 | Herf et al. | |
| 2020/0109845 | A1 | 4/2020 | Buil et al. | |
| 2021/0059031 | A1 * | 2/2021 | Goor | H05B 47/11 |
| 2023/0319963 | A1 * | 10/2023 | Borra | H05B 47/1985<br>315/152 |

* cited by examiner

METHOD AND LIGHTING SYSTEM WITH ADAPTIVE COLOR CONTROL

CROSS-REFERENCE TO PRIOR APPLICATIONS

This application is the U.S. National Phase application under 35 U.S.C. § 371 of International Application No. PCT/EP2023/066708, filed on Jun. 20, 2023, which claims the benefit of European Patent application Ser. No. 22/181,130.0, filed on Jun. 27, 2022. These applications are hereby incorporated by reference herein.

TECHNICAL FIELD

The present disclosure relates generally to the field of lighting. Specifically, it relates to methods and systems for providing adaptive color light scenes.

BACKGROUND

In the last few decades, development of lighting systems has accelerated. Instead of providing only illumination, new lighting solutions may provide activity-based lighting, lighting to set a mood or atmosphere, or even lighting to encourage a normal circadian rhythm. Many of the new solutions involve the use of colored lighting. Colored lighting may be useful for creating an atmosphere or to enhance an entertainment experience, such as watching a movie or playing a video game. While the colored lights may enhance an experience, it has been shown that in some cases the use of colored lighting may make users uncomfortable.

SUMMARY

It is therefore an object of the present invention to overcome at least some of the above-mentioned drawbacks, and to provide an improved control method and lighting system.

This and other objects are achieved by means of a method for controlling a plurality of color light sources and a lighting system as defined in the appended independent claims. Other embodiments are defined by the dependent claims.

According to a first aspect of the present disclosure, a method for controlling a plurality of color light sources is provided. The method comprises receiving a reference light scene comprising a color setting for at least one of the light sources. The method further comprises determining a position of a user in relation to the plurality of color light sources. The method further comprises determining a subset of the plurality of color light sources that are arranged to illuminate the determined position of the user. The method further comprises determining a desaturated light setting for at least one of the color light sources of the determined subset. The method further comprises controlling the plurality of color light sources based on the reference light scene, wherein the at least one color light source of the determined subset is controlled according to the determined desaturated light setting.

In order to create prominent colored light ambiences and immersive entertainment (content-based) light scenes, many different colored light sources may be used. Increasing the number of color light sources may increase the versatility of the possible light scenes. However, user studies have shown that people like to look at surfaces illuminated by colored light, but they do not like to see other users illuminated by colored light or be positioned themselves in a colored light effect.

The methods and systems of the present disclosure may provide dynamically adjustable light scenes based on a user position. Such adjustable light scenes may provide vibrant color lighting as ambient light, while still providing desaturated (whiter) light directed at and/or near a user.

For example, if no one is sitting at a table illuminated by one or more table lights, the table lights could render a colorful ambience light setting. When a user approaches the table, the table lights could timely adjust the color light output to whiter, more desaturated, light settings.

One use of color light scenes is to improve an entertainment experience. For example, when watching a film or playing a video game on a display, a lighting system may light up the area surrounding the display based on colors of the content shown on the display. Such a use of color lighting may increase the user's experience of being part of the film or game. Using the methods and systems provided in the present disclosure, an improved content immersion effect may be created around one or more viewers/players, without subjecting the user(s) to direct colored light.

Color light scenes may also be used to create dynamic lighting effects using dynamic light scenes. For example, the lights of a lighting system may slowly change color based on a color palette selected scene. Such dynamic lighting effects may create a more vibrant atmosphere.

The plurality of color light sources may form part of a connected lighting system. Throughout this disclosure, the plurality of color light sources may be referred to as the light sources. While the present disclosure relates mainly to the control of color light sources, it is appreciated that the methods and devices/systems provided herein may further include white light sources.

The color light sources may be variable color light sources or single-color light sources. For a variable color light source, a desaturated color light setting may comprise a color setting for providing a whiter version of a color. For a single-color light source, a desaturated color light setting may comprise a setting for providing a lower light intensity.

A light scene may comprise settings for multiple light sources. A color light scene may comprise settings for multiple color light sources, including a color setting for at least one of the light sources.

A reference color light scene (or a requested/initial light scene) may be determined, e.g., by a user. The reference color light scene may comprise a desired light scene for, e.g., a room or an area. The plurality of colored light sources may be controlled based on the reference color light scene adapted to the position of at least one user. For example, the plurality of colored light sources may be controlled in accordance with a determined light scene. The determined light scene may be based on the reference color light scene and include the determined desaturated light setting.

The subset of light sources may comprise at least one color light source which position and/or orientation may result in the light source being arranged to illuminate the determined position of the user. According to the methods/systems disclosed herein, at least some light sources of the subset of color light sources may be controlled using a desaturated light setting.

A level of desaturation of a light source/light setting relates to an intensity of a color of light emitted by the light source. A more desaturated light source provides a whiter light, while a more saturated (less desaturated) light source provides a more intense color light. A fully desaturated light source may provide white light.

According to some embodiments, the desaturated light setting may be determined based on one or more respective color light settings, defined in the reference light scene, for the subset of the plurality of color light sources.

A desaturated light setting may be determined for each of one or more of the determined subset of color light sources. For example, a desaturated light setting may be determined for a color light source of the subset based on a color light setting, defined in the reference light scene, for the color light source.

According to some embodiments, determining a desaturated light setting for at least one of the color light sources of the determined subset may comprise determining a level of desaturation for the desaturated light setting for the at least one light source of the determined subset of color light sources based on at least one of: a distance between the light source and the position of the user; an orientation of the light source relative to the position of the user; and a type of the light source.

For example, a light source arranged further away from the user may have a lower level of desaturation than a light source arranged closer to the user.

A light source arranged to provide light in a direction toward the position of the user may require a higher level of desaturation than a corresponding light source arranged to provide light in a direction away from the user.

As a further example, a spotlight, configured to provide directed light and often used as a functional light source, may require a higher level of desaturation than, e.g., a light-strip configured and/or arranged to provide diffuse/ambience lighting.

Different characteristics of the desaturation may be customizable. The characteristics may be adapted based on user's preferences. In certain embodiments, the characteristics may be indicated or included in the reference light scene.

A level of desaturation may be customizable. For example, a first user may prefer a higher level of desaturation and a second user may prefer a lower level of desaturation. The user (i.e., first or second user) may be indicated in the reference light scene, or otherwise indicated or identified.

Further, a speed of desaturation may also be customizable to provide a smooth and slow change, or a faster, more quickly adaptable, change in desaturation. The speed of desaturation may also be dependent on a dynamic scene setting of a dynamic light scene. For example, the speed of desaturation may be dependent on a color transition speed in a dynamic light scene.

A spread of desaturation, i.e., an area for which the light is desaturated, may also be customizable.

Further, some colors may be more saturated than others. For example, cooler colors, such as green/blue colors, may provide illuminated people with a less pleasant appearance or feeling compared to warmer colors (e.g., yellow or orange). Cooler colors may therefore be more desaturated than warmer colors.

According to some embodiments, determining a desaturated light setting for at least one of the color light sources of the determined subset may further comprise determining a color range of the reference light scene. Determining a desaturated light setting for at least one of the color light sources of the determined subset may further comprise determining a white point of the desaturated light setting based on the determined color range.

For example, the white point of desaturation may be dependent on the overall gamut of the colors rendered by the color light sources. For example, when the colors rendered by other lamps in an entertainment setup are predominantly warm, e.g., providing more yellow/red tones, the white point of the desaturated light sources may be adjusted accordingly. In such a case, the desaturation may be adjusted to a color temperature of, e.g., 2000K or 2700K. Alternatively, when colors of other lamps (light sources) are cooler, e.g., providing blueish tones, the white point could be closer to 5000K or 6500K.

As an alternative, a preferred white point of desaturation may be selected by a user or defined in the reference color light scene. Further, the method or lighting system may define a neutral color temperature white point, such as 2700K, to be used as a standard setting.

According to some embodiments, determining a position of a user may comprise receiving sensor input from at least one sensor. The position of the user may be based on the sensor input.

For example, the at least one sensor may comprise at least one of a motion sensor, a camera, a microphone, an RF sensor etc. The at least one sensor may form part of a (personal) user device, such as a smartwatch or a phone. A personal user device may further be used to identify a user, e.g., to adapt the control of the plurality of color light sources to personal preferences.

At least one sensor may be arranged together with one of the light sources. For example, a range sensor may be arranged together with a light source. Measurements from such a range sensor may be used by the controller to determine a distance from the light source to the user.

According to some embodiments, determining a position of a user may comprise predicting a future position of the user.

The control of the plurality of color light sources may for example be adjusted in an anticipatory fashion by predicting an approach or movement direction of a user. The prediction may for example be based on a speed and/or a direction of a moving user. The prediction may be based on machine-learned user patterns.

According to some embodiments, determining a position of a user may comprise accessing a predefined position of the user.

For example, a user may indicate one or more typical user positions, e.g., at a chair or a table. Such positions may for example be predefined at a system setup, or when the reference light scene is determined/requested.

It will be appreciated that determining the user position may comprise one or more of the above-described methods. For example, a predefined position may provide an initial position, one or more sensors could detect a change in position, and a future position may be predicted.

The position of the user, predefined, determined, and/or predicted, may be adapted to whether the person is sitting, standing, or lying down, or to the height of the person. For example, the position of the user may be focused on a position of the head of the user. The position of the user may be based on an average height of users or adapted to individual users.

According to some embodiments, the plurality of color light sources may comprise at least one color lighting device.

A color lighting device may be a color lamp, a color light strip, a color panel etc.

According to some embodiments, the plurality of color light sources may comprise a plurality of light nodes forming part of a color lighting unit.

A color lighting unit may be a larger color lighting device comprising a plurality of controllable light nodes. For example, a color lighting device may be a LED strip or panel having (individually) controllable LEDs (nodes), a display, a lighting panel, etc.

According to a second aspect of the present disclosure, a lighting system is provided. The lighting system comprises a plurality of color light sources. Further, the lighting system comprises a controller. The controller is configured to receive a reference light scene comprising a color setting for at least one of the light sources. The controller is further configured to determine a position of a user in relation to the lighting system. The controller is further configured to determine a subset of the plurality of light sources arranged to illuminate the position of the user. The controller is further configured to determine a desaturated light setting for at least one of the color light sources of the determined subset. The controller is further configured to control the plurality of color light sources based on the reference light scene, wherein the at least one color light source of the determined subset is controlled according to the determined desaturated light setting.

The lighting system may communicate wirelessly. Some or all of the devices within the lighting system may be connected by (and communicate through) wires.

According to some embodiments, the controller may further be configured to determine the desaturated light setting based on one or more respective color light settings, defined in the reference light scene, for the subset of the plurality of color light sources.

According to some embodiments, the controller may be further configured to determine a level of desaturation for the desaturated light setting for at least one light source of the determined subset of light sources based on at least one of: a distance between the color light source and the position of the user, an orientation of the color light source relative to the position of the user, and a type of the color light source.

According to some embodiments, the controller may be further configured to determine a color range of the reference light scene. The controller may further be configured to determine a white point of the desaturated light setting based on the determined color range.

According to some embodiments, the system may further comprise at least one sensor in communicative contact with the controller. The controller may further be configured to receive a sensor input from the at least one sensor. The controller may be further configured to determine the position of the user based on the sensor input.

According to some embodiments, the controller may be further configured to predict a future position of the user. According to some embodiments, the controller may be configured to determine the position of the user based on accessing a predefined position of the user.

According to some embodiments, the plurality of light sources may comprise at least one color lighting device. The controller may be configured to control at least a light output of the color lighting device. For example, the controller may be configured to control an intensity and/or a color of light emitted by the color lighting device.

According to some embodiments, the plurality of light sources may comprise a plurality of light nodes forming part of a color lighting unit. The controller may be configured to control at least a light output of each of the light nodes. For example, the controller may be configured to control an intensity and/or a color of light emitted by each of the light nodes. The controller may be configured to control each of the light nodes independently, or there may be a correlation between at least some of the light nodes.

It will be appreciated that, although some features are described in more detail with reference to the first aspect or the second aspect, equivalent features may apply for the other aspect. For example, the controller of the lighting system may be configured to perform embodiments of the method as described with reference to the first aspect. Further, the methods of the first aspect may employ embodiments of the system as described with reference to the second aspect.

It is further noted that other embodiments using all possible combinations of features recited in the above-described embodiments may be envisaged. Thus, the present disclosure also relates to all possible combinations of features mentioned herein.

BRIEF DESCRIPTION OF DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

In the below figures, similar features, elements and/or functions may be illustrated in more than one figure. In order to avoid repetition, certain features, elements and/or functions may be described in more detail in reference to only one figure. The features are identified by reference numbers made up of the number of the figure to which it relates followed by the number of the feature, which are equivalents for all exemplifying embodiments, e.g., the common feature "10" is indicated by "110" in FIG. 1 while the corresponding feature is indicated by "210" in FIG. 2.

Figure 1:
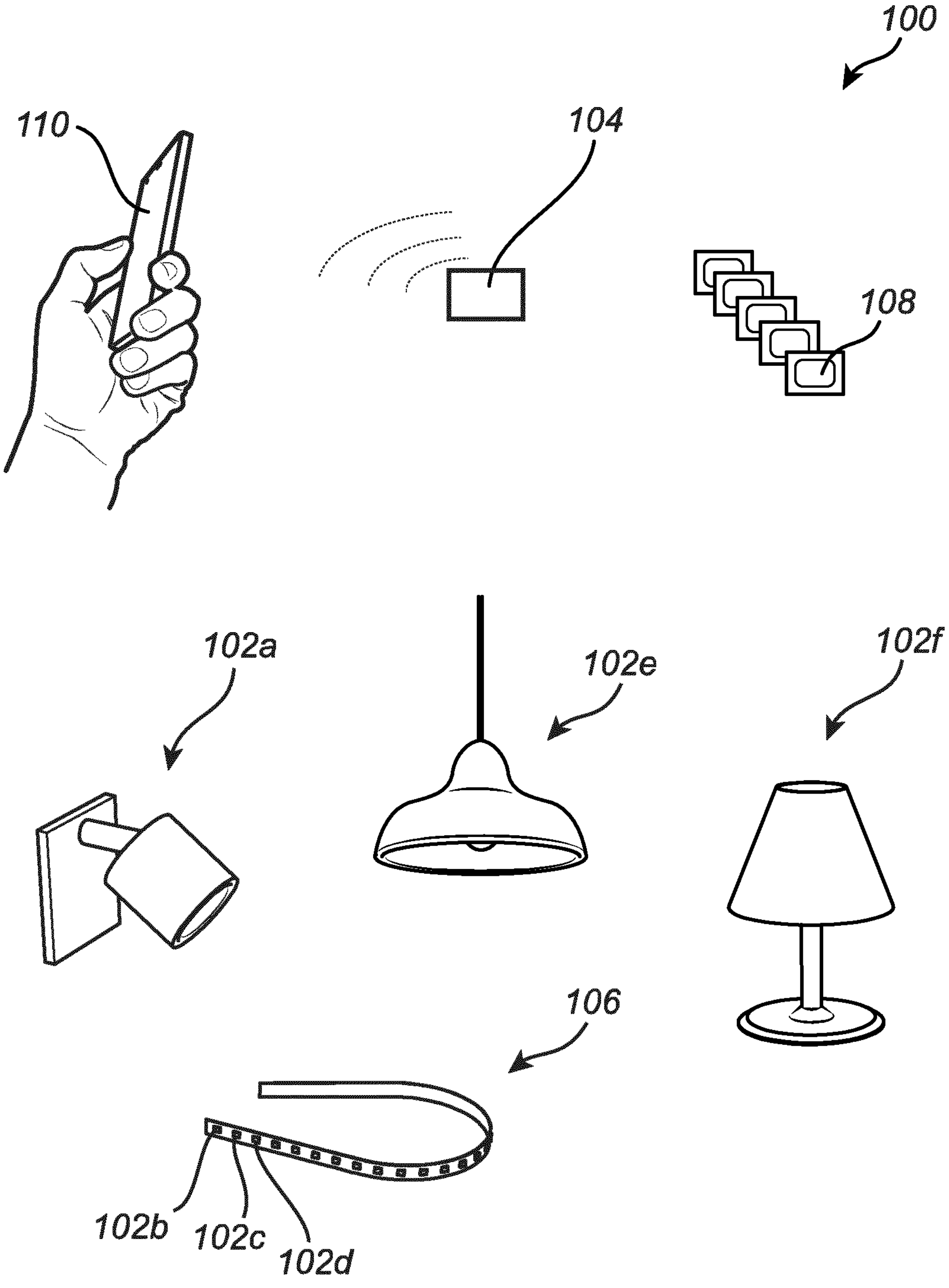
FIG. 1 is a schematic illustration of a lighting system, in accordance with some embodiments.

With reference to FIG. 1, a lighting system 100, in accordance with some embodiments, will be described.

The lighting system 100 comprises a plurality of color light sources 102*a-f* and a controller 104. The controller 104 may be configured to control the plurality of light sources 102*a-f* using a control method, such as method 2000 which will be described below with reference to FIG. 2.

The plurality of light sources 102*a-f* comprises different types of light sources, such as a spotlight 102*a*, a ceiling pendulum light 102*e* and a table light 102*f*. The plurality of light sources also includes a plurality of light nodes 102*b-d*, in the form of light emitting diodes LEDs, which form part of a lighting unit 106, in the form of a LED strip.

The lighting system 100 also comprises a plurality of sensors 108. The plurality of sensors 108 may be configured to send sensor input to the controller 104. The controller 104 may detect the presence of a user based on input from the sensors 108. The controller 104 may determine a position of a user, in relation to one or more of the light sources, based on the sensor input.

In FIG. 1, the lighting system 100 comprises a personal user device 110 in the form of a mobile phone. The controller 104 may be implemented in the mobile phone 110. Alternatively, or additionally, a user may use the personal user device (mobile phone) 110 to provide an input to the lighting system 100. For example, a user may provide, indicate, or determine a reference lighting scene using the personal user device 110. The personal user device 110 may also be in communication with the sensors 108. For example, the controller 104 and sensors 108 may determine a position of a user based on the location of the personal user device 110.

In the lighting system 100 illustrated in FIG. 1, the controller 104 is in wireless communication with the light sources 102*a-f*, sensors 108 and personal user device 110. However, in other embodiments, some of the devices in the lighting system 100 may be connected by, and communicate through, wires.

Figure 2:
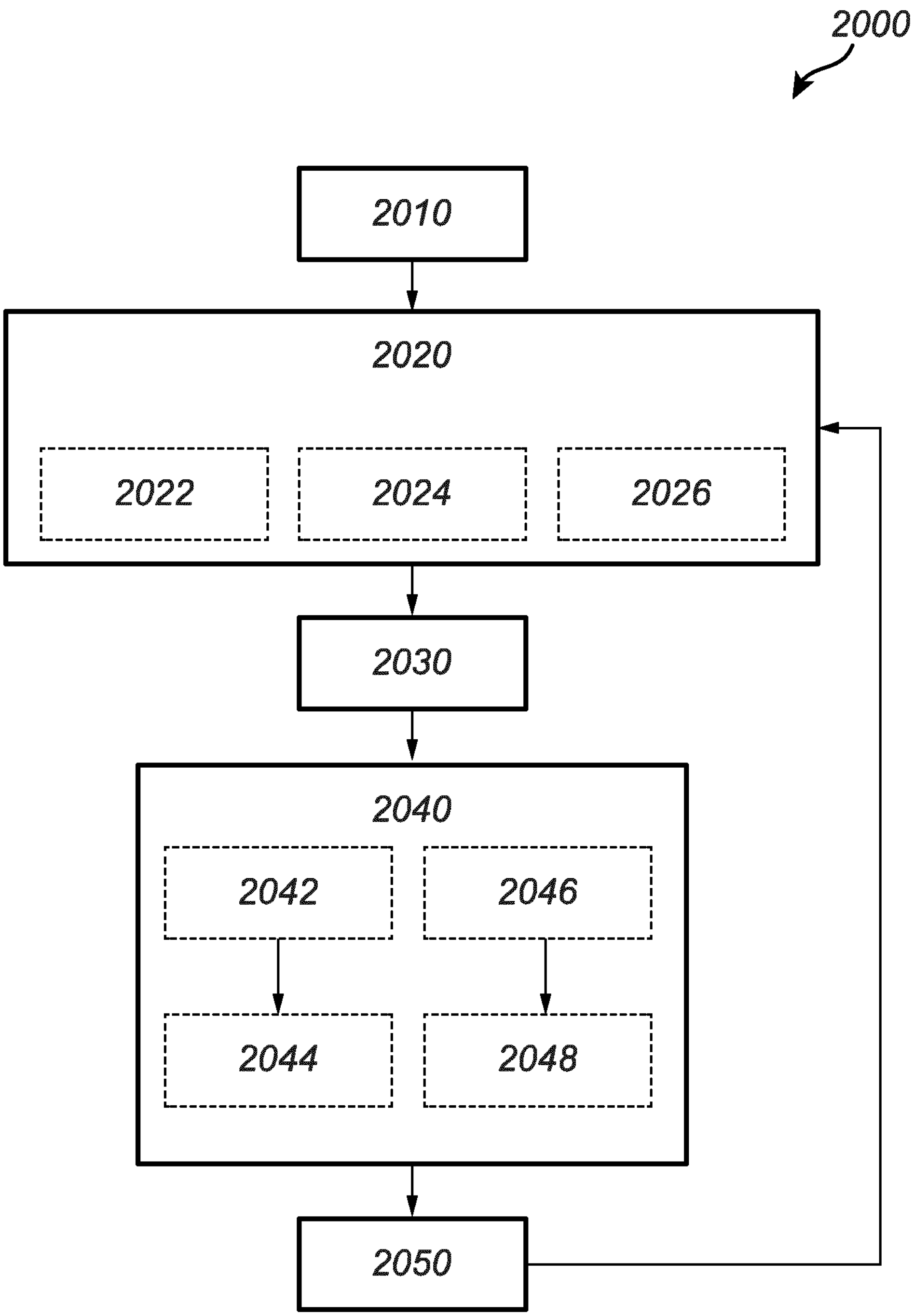
FIG. 2 is a flow chart illustrating a method for controlling a plurality of color light sources, in accordance with some embodiments.

With reference to FIG. 2, a method 2000 for controlling a plurality of color light sources will be described.

The method 2000 may for example be implemented in a controller of a lighting system, such as the controller 104 of the lighting system 100 described above with reference to FIG. 1.

The method 2000 comprises receiving, at step 2010, a reference light scene. The reference light scene comprises a color setting for at least one light source. The reference light scene may comprise individual settings for each of a plurality of light sources in a setup. Alternatively, one or more light sources may be linked such that there is a correlation between their light settings. A light setting may include a color setting and/or an intensity setting defining a light output of a light source. A light setting for a light source may include that the light source should be turned off. The reference light scene may be received from a user via a user interface. The user interface may, e.g., form part of a personal user device.

The method 2000 further comprises, at step 2020, determining a position of a user in relation to the plurality of color light sources. In some embodiments, the method may comprise receiving, at step 2022, a sensor input from at least one sensor, such as the sensors 108 described above with reference to FIG. 1. In some embodiments, the method may comprise predicting, at step 2024, a future position of the user. In some embodiments, the method may comprise accessing, at step 2026, a predefined position of a user. It will be appreciated that the determination 2020 of the position of the user may include one or more of receiving sensor input 2022, predicting a future position 2024, and accessing a predefined position 2026.

When the position of the user has been determined, the method comprises, at step 2030, determining a subset of the light sources which are arranged to illuminate the position of the user. For example, the subset of light sources may comprise light sources arranged in a proximity of the user's position. The subset of light sources may comprise light sources arranged further away from the user but arranged to direct light in a direction towards the user. The determination 2030 of the subset of light sources may for example be based on at least one of the positions of the light sources, the types of the light sources, and the orientations of the light sources. Further, the determination 2030 of the subset of the light sources may take the reference light scene into account. For example, the subset may only comprise light sources for which light settings are provided in the reference light scene. Alternatively, the subset may also comprise other light sources for which light settings are not provided in the reference light scene.

The method 2000 further comprises determining 2040 a desaturated light setting for at least one color light source of the subset of light sources as determined in step 2030. The desaturated light setting for the at least one light source may for example be based on a light setting for the color light source in the reference light scene.

In some embodiments, the step of determining 2040 a desaturated light setting may comprise determining 2044 a level of desaturation for the desaturated light setting of the at least one light source of the subset of color light sources. At step 2042, the method may comprise obtaining (accessing or determining) information on which to base the determination 2044 of the level of desaturation for the desaturated light setting of the light source in question. For example, the information obtained at step 2042 may comprise a distance between the light source in question and the position of the user. The information obtained at step 2042 may comprise an orientation of the light source relative to the position of the user. Alternatively, or additionally, the information obtained at step 2042 may comprise a type of the light source in question. Further, the level of desaturation may be based on a known (predefined) preference of a user.

Further, the determination 2040 of the desaturated light setting may also comprise determining 2046 a color range (or gamut) of the reference light scene. A white point of the desaturated light setting may be determined 2048 based on the determined color range.

The method 2000 further comprises controlling 2050 the plurality of light sources based on the reference light scene received at step 2010, wherein the at least one color light source of the determined subset is controlled according to the desaturated light setting determined in step 2040. The method 2000 may then return to step 2020, as is illustrated in FIG. 2, to determine a new position of the user. Alternatively, the method may start over at receiving a new reference light scene at step 2010.

Figure 3:
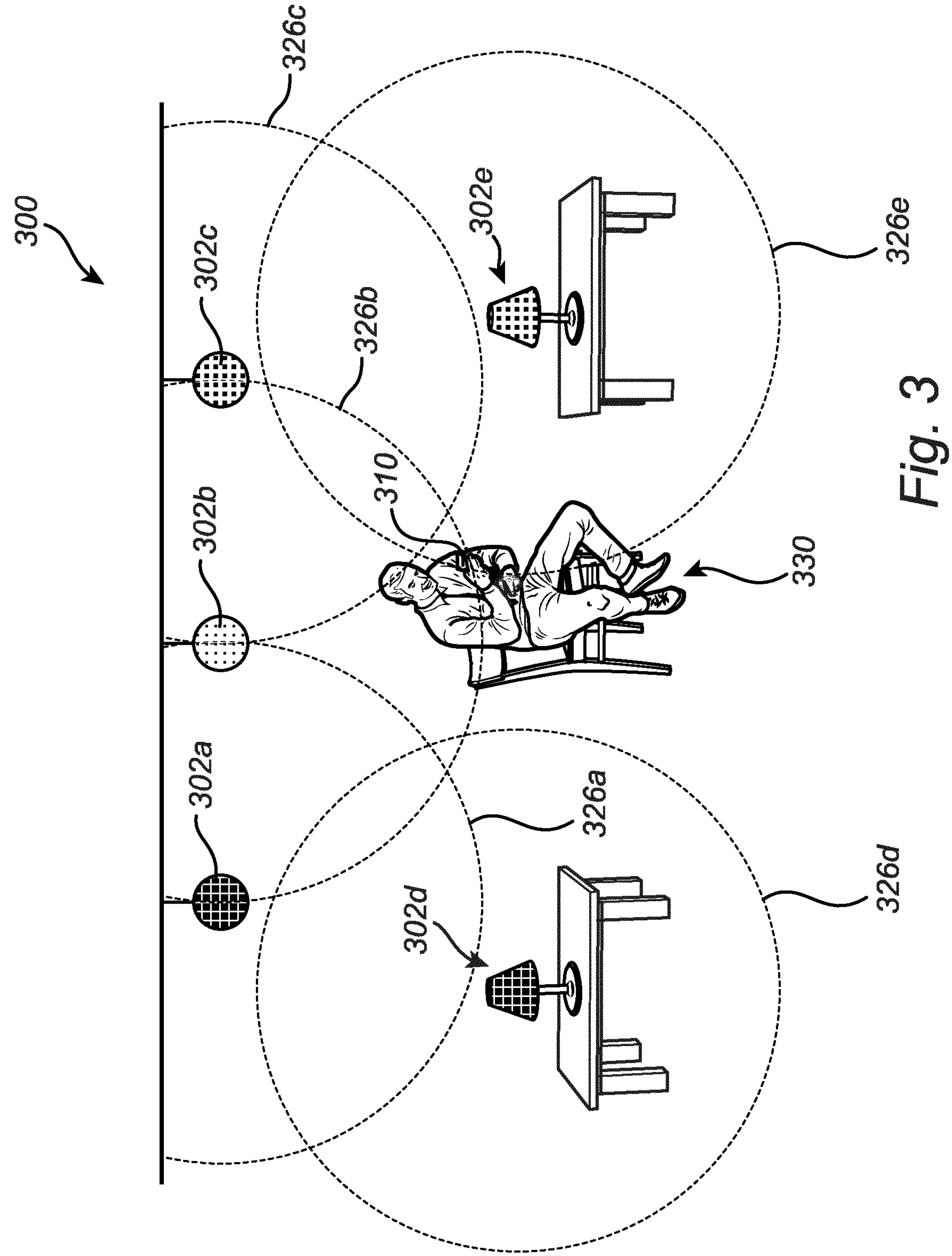
FIG. 3 is an illustration of an indoor lighting system, in accordance with some embodiments.

With reference to FIG. 3, an example of a lighting system 300 will be described.

FIG. 3 is a schematic illustration of a user 330 surrounded by different light sources (lighting devices) 302*a-e* of a lighting system 300. The lighting system 300 may be equivalent to the lighting system 100 described above with reference to FIG. 1. The lighting system 300 may be controllable using the method 2000 described above with reference to FIG. 2. The user 330 is holding a personal user device 310 in the form of a mobile phone or a tablet computer. The personal user device 310 may act as an input device to the lighting system 300, with which the user 330 may provide inputs or settings to the lighting system 300.

The personal user device 310 may comprise a controller (not depicted) of the lighting system 300. The personal user device 310 may interact with sensors (not depicted) of the lighting system 300, for determination of the user's position.

The lighting system 300 comprises three ceiling lights 302*a-c*, and two table lights 302*d-e*. For illustrative purposes, the lighting devices 302*a-e* are illustrated as providing homogeneous light in all directions. The illumination provided by each of the lighting devices 302*a-e* is illustrated by a circle 326*a-e*, concentric with the lighting device 302*a-e*.

The user 330 is sitting to the right of the center ceiling light 302*b*. The illumination circles 326*b*, 326*c* and 326*e* corresponding to the light provided by the center and right ceiling lights 302*b*, 302*c* and the right table light 302*e*, intersect with the user 330. The subset of light sources which are arranged to illuminate the position of the user may therefore comprise the center and right ceiling lights 302*b*, 302*c* and the right table light 302*e*. When controlled in accordance with any of the methods described throughout this disclosure, the center and right ceiling lights 302*b*, 302*c* and the right table light 302*e* may be provided with a desaturated light setting. The left table light 302*d* and the left ceiling light 302*a*, which are not arranged to illuminate the position of the user 330, may each be provided with a light setting for which the saturation level is unchanged compared with a reference light scene.

Further, the person (user) 330 is sitting closer to the center ceiling light 302*b* than the right ceiling light 302*c* and the right table light 302*e*. A level of desaturation for each of the light sources may be determined based (in part) on a distance between the light source and the user's position. Therefore, the center ceiling light 302*b* may have a higher level of desaturation than the right ceiling light 302*c* and the right table light 302*e*.

In general, users do not like colored lights shining in their face. Therefore, the position of the user may take the position of the users 330 head into account. For example, the determination of the position of the user may take the height of the user, or an average height of users, into account.

Figure 4:
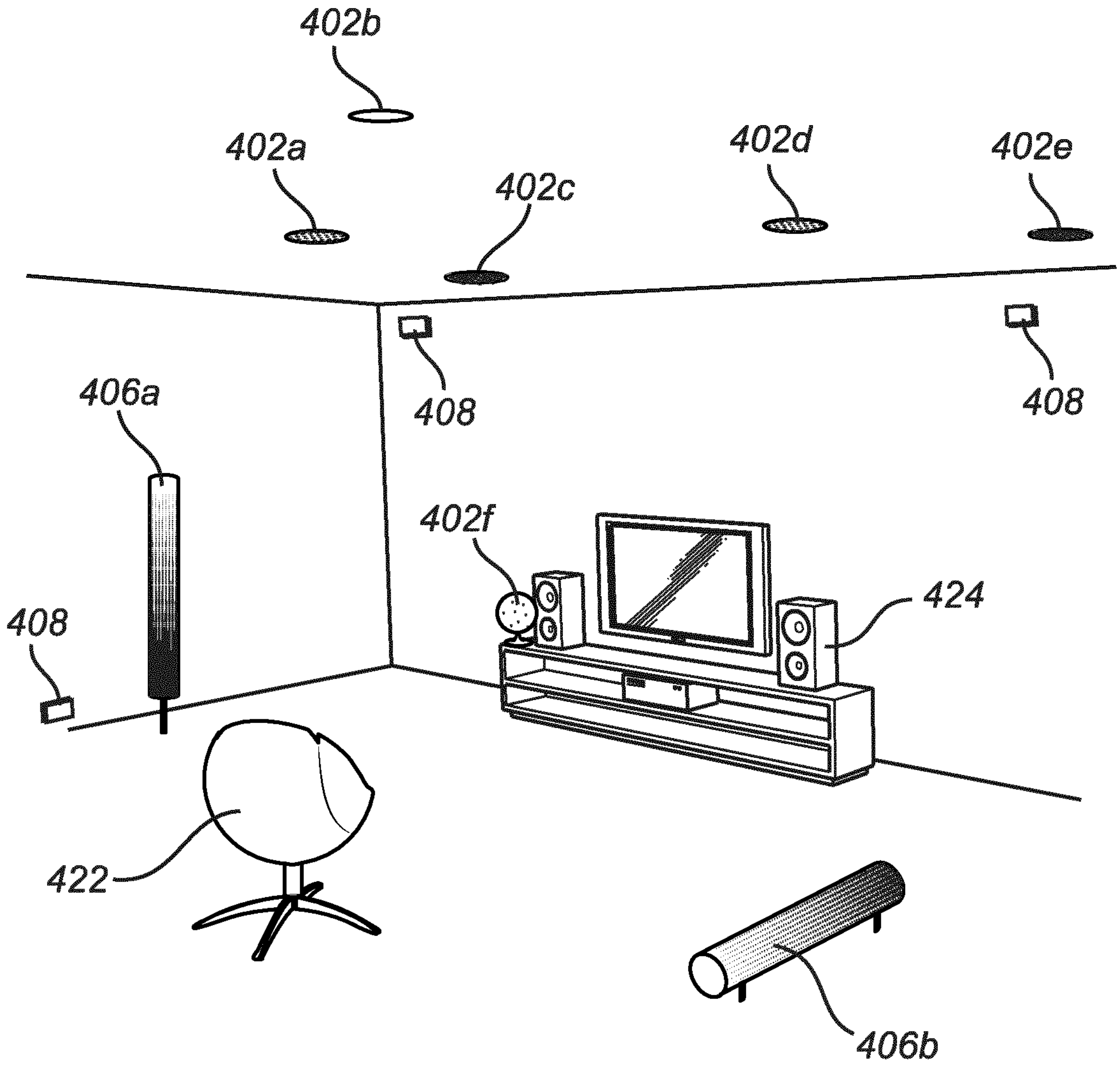
FIG. 4 is an illustration of a lighting system, in accordance with some embodiments, forming part of an entertainment setup.

With reference to FIG. 4, a lighting system 400 will be described.

FIG. 4 illustrates a room with a chair 422 and an entertainment setup 424. The entertainment setup 424 is schematically illustrated with a TV screen and a pair of speakers on a bench.

The room also comprises a lighting system 400. The lighting system 400 may be equivalent to any of the lighting systems 100, 300 described above with reference to the preceding figures. The lighting system 400 may be controllable using the method 2000 described above with reference to FIG. 2. The lighting system 400 comprises a plurality of color light sources including a plurality of color lighting devices 402*a-f* and two color lighting units 406*a-b*. The lighting system 400 also comprises a plurality of sensors 408, for detecting and determining a position of a user in the room 420. The controller of the lighting system 400 is not illustrated in FIG. 4.

In an entertainment setup as illustrated in FIG. 4, a user will very likely be positioned in the chair 422 when watching TV, playing a video game etc. The chair 422 may therefore be registered/identified in the lighting system 400 as a predefined user position.

In FIG. 4, the lighting devices 402*a-f* are arranged at different distances from the chair 422. One lighting device 402*b* is arranged close to the chair 422. Two intermediate lighting devices 402*a* and 402*d* are arranged slightly further away, and three most distant lighting devices 402*c*, 402*e* and 402*f* are arranged the furthest away. In the illustration in FIG. 4, the table light 402*f*, next to the entertainment setup 424, provides a different color light than the other lighting devices 402*a-e* and lighting units 406*a*, 406*b*.

When controlled in accordance with the methods described in this disclosure, the lighting device 402*b* closest to the chair may have a first desaturation level. The intermediate lighting devices 402*a* and 402*d* may have a second, lower, desaturation level. The three most distant lighting devices 402*c*, 402*e* and 402*f* may be even less desaturated than the lighting device 402*e* or not desaturated at all.

In FIG. 4, a light output of the lighting units 406*a*, 406*b*, is also adapted to the position of the user, i.e., the chair 422. The lighting units 406*a*, 406*b* each comprise a plurality of light nodes. For example, the lighting units 406*a-b* may be LED strips, each comprising a plurality of LEDs. Light nodes which are closer to the predefined position of the user, and thus arranged to illuminate the user more strongly, are more desaturated than light nodes which are further away from the user (or the chair 422). The levels of desaturation of light nodes may be adapted to form a desaturation gradient over the lighting unit 406*a-b*.

Figure 5:
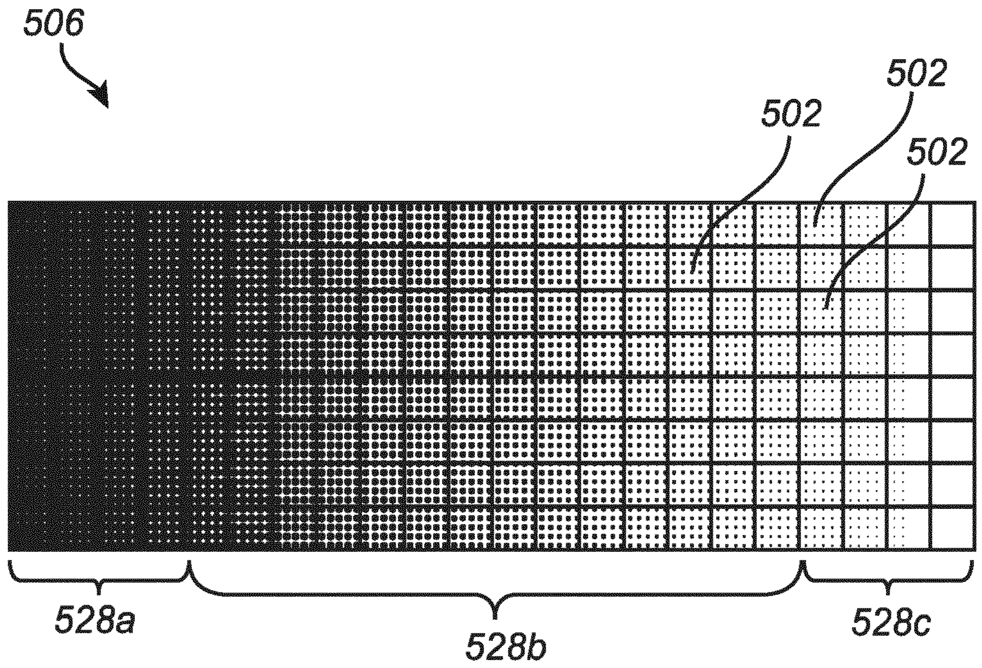
FIGS. 5 and 6 illustrate a lighting system including a color lighting unit, in accordance with some embodiments.
Figure 6:
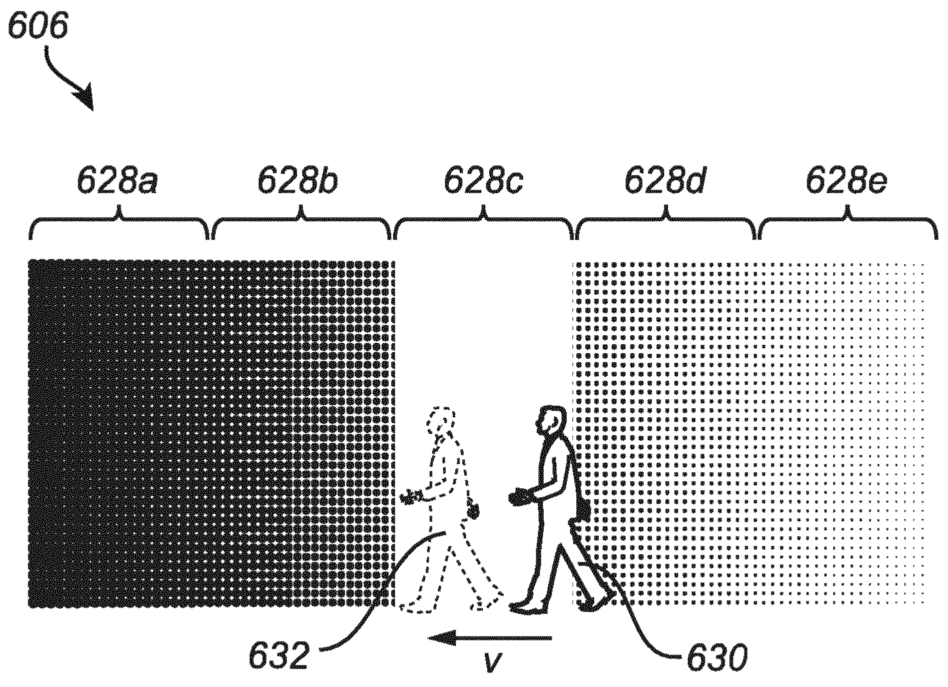

With reference to FIGS. 5 and 6, a lighting system 500 comprising a lighting panel 506, 606 will be described.

The lighting system of FIGS. 5 and 6 may be equivalent to any of the lighting systems 100, 300, 400 described above with reference to the preceding figures. Further, the lighting system of FIGS. 5 and 6 may be controllable using a method 2000 as described above with reference to FIG. 2.

The lighting panel 506 comprises a plurality of lighting nodes 502. In FIG. 5, the lighting panel is illuminated with a gradient color, such that lighting nodes 502 of a first region 528*a* of the lighting panel 506 are illuminated with a first color. Lighting nodes 502 in a second region 528*b* are illuminated to form a gradient between the first color and a second color, from left to right. Lighting nodes 502 of a third region 528*c* are illuminated with the second color.

Each of the lighting nodes 502 may be controlled by a light setting. The light settings for each lighting node 502 may be part of a light scene. In FIG. 5, there is no user present, the light panel 506 may therefore be illuminated according to a reference light scene.

In FIG. 6, the same light panel 606 is illustrated. In FIG. 6, however, a user 630 is walking in front of the light panel 606. Therefore, a light output of the light panel 606 has been adapted to the position of the user 630. Further, the user 630 is walking at a speed v along the light panel 606, from right to left in the picture. The lighting system may therefore predict a future position 632 of the user. In FIG. 6, the light output of the light panel 606 is based on the reference light scene illustrated in FIG. 5. Further, the light scene (light settings for the color light nodes) used to control the light panel 606 has been adapted based on the current position of the user 630 and the future position 632 of the user. As a result, the light panel is divided into five regions. A first region 628*a* is illuminated according to the reference light scene. The second region, closer to the user 630 and the future position 632 of the user, is illuminated to form a desaturation gradient with increasing desaturation closer to the user 630 and future position 632 of the user. A third region 628*c* is centered around the user 630 and the future position 632 of the user. In the third region, the light output of the panel is the most desaturated. In the present example, the most desaturated light is white light, having a white point determined based on the color range of the reference light scene. Behind the user 630, in a fourth region 628*d*, the panel is illuminated to form a desaturation gradient with increasing saturation in a direction away from the user. In the fifth region 628e, the lighting panel is illuminated in accordance with the reference light scene.

As the user 630 moves along the lighting panel 606, the boundaries of the desaturated region 628b-d may move together with the user 630.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method for controlling a plurality of color light sources, the method comprising:

receiving a reference light scene comprising a color setting for at least one of the color light sources;

determining a position of a user in relation to the plurality of color light sources;

determining a subset of the plurality of color light sources which are arranged to illuminate the position of the user;

determining a desaturated light setting for at least one of the color light sources of the determined subset, wherein the desaturated light setting is determined based on one or more respective color light settings defined in the reference light scene for the subset of the plurality of color light sources; and controlling the plurality of color light sources based on the reference light scene, wherein the at least one color light source of the determined subset is controlled according to the determined desaturated light setting.

2. The method of claim 1, wherein determining the desaturated light setting for the at least one of the color light sources of the determined subset further comprises determining a level of desaturation for the desaturated light setting based on at least one of:

a distance between the at least one color light source and the position of the user;

an orientation of the at least one color light source relative to the position of the user; and a type of the at least one color light source.

3. The method of any of claim 1, wherein determining the desaturated light setting for the at least one of the color light sources of the determined subset further comprises:

determining a color range of the reference light scene; and determining a white point of the desaturated light setting based on the determined color range.

4. The method of claim 1, wherein determining the position of the user comprises:

receiving a sensor input from at least one sensor; and determining the position of the user based on the sensor input.

5. The method of claim 1, wherein determining the position of the user comprises predicting a future position of the user.

6. The method of claim 1, wherein determining the position of the user comprises accessing a predefined position of the user.

7. The method of claim 1, wherein said plurality of light sources comprises at least one color lighting device and/or a plurality of light nodes forming part of a color lighting unit.

8. A lighting system comprising:

a plurality of color light sources; and a controller configured to:

receive a reference light scene comprising a color setting for at least one of the color light sources;

determine a position of a user in relation to the lighting system;

determine a subset of the plurality of color light sources arranged to illuminate the position of the user;

determine a desaturated light setting for at least one of the color light sources of the determined subset; and control the plurality of color light sources based on the reference light scene, wherein the at least one color light source of the determined subset is controlled according to the determined desaturated light setting, wherein the controller is further configured to determine the desaturated light setting based on one or more respective color light settings defined in the reference light scene for the subset of the plurality of color light sources.

9. The lighting system of any of claim 8, wherein the controller is further configured to determine a level of desaturation for the desaturated light setting based on at least one of:

a distance between the at least one color light source and the position of the user;

an orientation of the at least one color light source relative to the position of the user; and a type of the at least one color light source.

10. The lighting system of claim 8, wherein the controller is further configured to:

determine a color range of the reference light scene; and determine a white point of the desaturated light setting based on the determined color range.

11. The lighting system of claim 8, further comprising at least one sensor in communicative contact with the controller, wherein the controller is further configured to:

receive a sensor input from the at least one sensor; and determine the position of the user based on the sensor input.

12. The lighting system of claim 8, wherein the controller is further configured to predict a future position of the user and/or to determine the position of the user based on accessing a predefined position of the user.

13. The lighting system of claim 8, wherein said plurality of light sources comprises at least one color lighting device and/or a plurality of light nodes forming part of a color lighting unit.

* * * * *